(12) United States Patent
Wethington et al.

(10) Patent No.: US 6,259,689 B1
(45) Date of Patent: Jul. 10, 2001

(54) SPREAD ALOHA MULTIPLE ACCESS (SAMA) RESERVATION CHANNELS

(75) Inventors: Carin Wethington, Forest Knolls; Danurahardjo Tjahjono, San Francisco, both of CA (US)

(73) Assignee: ALOHA Networks, Inc., San Francisco, CA (US)

( * ) Notice: Subject to any disclaimer, the term of this patent is extended or adjusted under 35 U.S.C. 154(b) by 0 days.

(21) Appl. No.: 09/729,946

(22) Filed: Dec. 6, 2000

(51) Int. Cl.$^7$ .................................................. H04B 7/216
(52) U.S. Cl. ........................ 370/342; 370/342; 370/347; 370/441
(58) Field of Search .......................... 370/320, 335–337, 370/341–342, 345, 347–348, 441–443; 375/140–141, 146

(56) References Cited

U.S. PATENT DOCUMENTS

| | | | |
|---|---|---|---|
| 5,245,612 | * | 9/1993 | Kachi et al. ........................ 370/324 |
| 5,457,713 | * | 10/1995 | Sanderford, Jr. et al. ........... 375/145 |
| 5,537,397 | * | 7/1996 | Abramson ........................... 370/441 |
| 5,581,547 | * | 12/1996 | Umeda et al. ....................... 370/342 |
| 5,701,297 | * | 12/1997 | Csapo et al. ........................ 370/341 |
| 5,734,639 | * | 3/1998 | Bustamante et al. ............... 370/335 |
| 5,737,329 | * | 4/1998 | Horiguchi ........................... 370/342 |
| 5,745,485 | * | 4/1998 | Abramson ........................... 370/342 |
| 5,960,028 | * | 9/1999 | Okamoto et al. ................... 375/130 |
| 6,038,223 | * | 3/2000 | Hansson et al. .................... 370/329 |
| 6,091,717 | * | 7/2000 | Honkasalo et al. ................. 370/329 |
| 6,151,313 | * | 11/2000 | Abramson ........................... 370/342 |

* cited by examiner

*Primary Examiner*—Chin Wellington
*Assistant Examiner*—Maikhanh Tran
(74) *Attorney, Agent, or Firm*—James Creighton Wray; Meera P. Narasimhan

(57) ABSTRACT

A SPREAD ALOHA Multiple Access (SAMA) channel uses distinct chip phases to label portions of a common SAMA channel and to reserve specific phases by means of a random access packet in the same SAMA channel. In the new SAMA reservation channel protocol, reservations consisting of the specification of a given chip phase are transmitted in a random access mode in a common SAMA channel. After a given user has reserved a given chip phase, that chip phase can be used on a reserved basis by that user to guarantee a certain quality of service. The reservation can be made by a user who simply initiates transmissions with a given chip phase and continues to use that chip phase if the user's first packet (the packet making the reservation) is received correctly. The SAMA hub broadcasts a list of reserved chip phases or broadcasts a list of free chip phases to ensure that other transmitters do not use the reserved chip phase. Alternately, the hub requires a transmitter to adjust chip phases of its transmitters.

11 Claims, 1 Drawing Sheet

SPREAD ALOHA MULTIPLE ACCESS (SAMA) RESERVATION CHANNELS

BACKGROUND OF THE INVENTION

Reservation ALOHA channels have been discussed and analyzed in the literature since the first reservation ALOHA channel was proposed. In a reservation ALOHA channel the random access ALOHA channel is used to transmit a packet which reserves capacity either in a separate channel or in fixed time locations in the ALOHA channel itself. However all reservations made in a reservation ALOHA channel are made for capacity which is used as a separate dedicated data channel.

SPREAD ALOHA Multiple Access (SAMA) systems are distinguished from Code Division or Time Division Multiple Access (CDMA or TDMA) systems, which assign separate spreading codes or times to individual users. In a SAMA system multiple users with remote transmitter units (RTUS) employ identical spreading codes in random access modes. SAMA systems are described in U.S. Pat. Nos. 5,537,397 and 5,745,485, the disclosures of which are incorporated herein by reference.

Needs exist for reservations systems for SAMA users and for improved reservations systems which do not require separate dedicated channels.

SUMMARY OF THE INVENTION

The present invention addresses those needs with a new random access SPREAD ALOHA Multiple Access (SAMA) reservation system. In the new invention reservations for specific chip phase are transmitted in a random access mode. A user reserves and uses a specific chip phase. Alternatively, reservation may be made by beginning a transmission with a certain chip phase and continuing to use that chip phase. The SAMA hub broadcasts a list of reserved chip phases or broadcasts a list of free chip phases to ensure that other transmitters do not use the reserved chip phase. Alternately, the hub requires a transmitter to adjust chip phases of its transmitters.

In a SPREAD ALOHA Multiple Access (SAMA) channel it is possible to use distinct chip phases to label portions of a common SAMA channel and to reserve specific phases by means of a random access packet in the same SAMA channel. That is the basis of this invention.

In the new SAMA reservation channel protocol, reservations consisting of the specification of a given chip phase are transmitted in a random access mode in a common SAMA channel. After a given user has reserved a given chip phase, that chip phase can be used on a reserved basis by that user to guarantee a certain quality of service. In an alternate realization of the invention the reservation can be made by a user who simply initiates transmissions with a given chip phase and continues to use that chip phase if the user's first packet (the packet making the reservation) is received correctly.

In both cases the hub station of the SAMA network broadcasts a list of the reserved chip phases (or alternatively of the free chip phases) to all users to ensure that no transmitter, other than the one making the reservation, transmits at an occupied chip phase.

This kind of reservation in a SAMA channel can provide the confirmed reservations required to transmit long files or digitized compressed voice signals within a SPREAD ALOHA network. This latter capability was not feasible in conventional ALOHA networks or even in those with a separate channel or fixed time location reservation capability, since the burst data rate of conventional ALOHA was not consistent with the requirements of several voice channels.

A SPREAD ALOHA Multiple Access (SAMA) System transmits packets of data bytes as chips in particular phases on a multiple access channel using identical spreading codes and interposing the data packets from distinct individual sources. A new reservation channel protocol reserves chip phases for transmitting long files or digitized compressed voice signals in the data packets. A hub station broadcasts lists of chip phases to users of the channel, insuring that no transmitter other than the transmitter making the reservation transmits data packets in chips at an occupied chip phase.

In one embodiment, the hub station broadcasts a list of reserved chip phases. In another embodiment, the hub station broadcasts a list of free chip phases.

A new method of using a Spread ALOHA Multiple Access (SAMA) channel uses a reservation protocol for transmitting long data files or digitized compressed voice signals from a transmitter to a hub. Chip phases are reserved by transmitting chips representative of bits in long spread bit data packets or by requesting reserved chip phases for use in the transmitting of the long data packets. In one embodiment, reserving the chip phases occurs by beginning the transmitting of chips. The hub station broadcasts a list of reserved or available chip phases.

These and further and other objects and features of the invention are apparent in the disclosure, which includes the above and ongoing written specification, with the claims and the drawings.

DETAILED DESCRIPTION OF THE PREFERRED EMBODIMENTS

In a SPREAD ALOHA Multiple Access system transmitters transmit packets of bits. Each bit is spread into chips using identical codes. In the SAMA channel, the spreading code uses 31 chips for each bit in a particular representation of ones and zeros. Every packet starts with a 24 bit synchronization field. Longer data packets have 512 bits of data plus the 24 bits of synchronization.

A single filter in the hub recognizes the SAMA code signals. The signals are separated by the starts of synchronization the bit field and the phases of the signals. When it is necessary to transmit long files or digital compressed voice signals which require substantially continuous transmissions, the present invention provides a reservation system in which specific chip phases are reserved for the transmission of the long files or the digitized compressed voice signals within the SPREAD ALOHA network.

Figure 1:
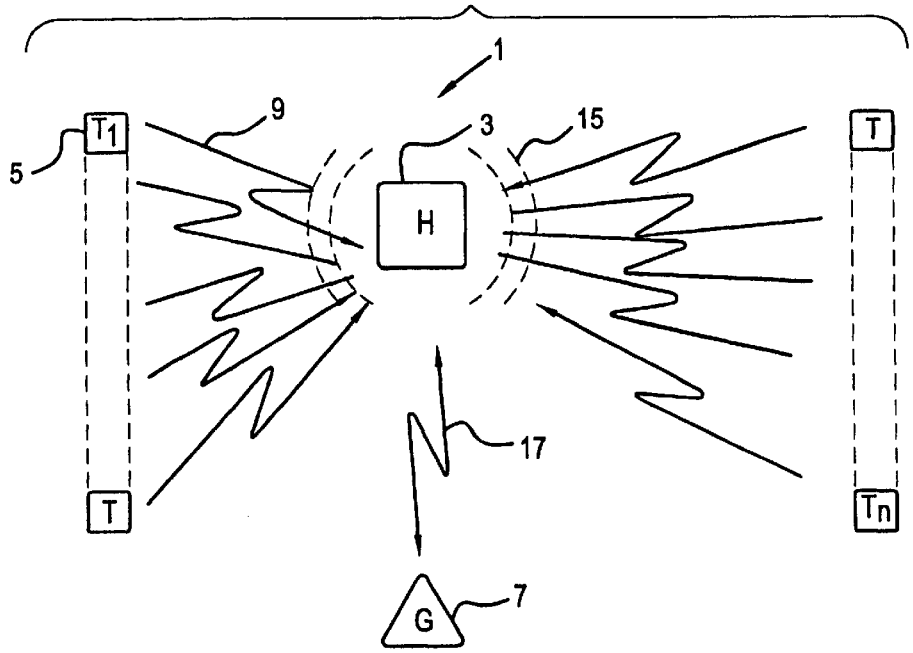
FIG. 1 is a schematic representation of transmitters in a hub in a SAMA system.

As shown schematically in FIG. 1, the SAMA system 1 has a hub 3 and multiple transmitters T1 through Tn which are generally indicated by the numeral 5 and a gateway 7. The transmitters 5 transmit packets of bits 9. Each bit in the transmitted packets is spread into 31 chips using an identical spreading code. The same spreading code is used in all of the data packets transmitted by the transmitters Ti through Tn. Sometimes two distinct spreading codes may be used. Several or all of the transmitters 5 may be active at the same time. When one or more transmitters is transmitting long data files or digitized compressed voice signals, substantially continuous transmission of packets 9 is required. In that case, one or more transmitters can reserve chip phases in which the transmissions are conducted.

In a normal SAMA system, the data packets may be transmitted from transmitters 1 through transmitter n without regard to the transmissions from the other transmitters. A filter in hub 3 recognizes the transmitted spreading code. Filters or detectors in the hub sort the signals from several transmitters according to the strengths of the signals, the start times of the bit synchronization fields in each packet and the phase of the chips.

Figure 2:
FIG. 2 is a schematic representation of chips and phases.

As shown in FIG. 2, the chips are spread in time. The chips are over sampled, so that the sampling occurs eight times or more between the chips. The phase of the incoming chips may be reserved to provide high quality for the long files and the digitized voice signals. As shown in FIG. 2, the chips are represented by the numeral 11 and particular chip phases are shown by numeral 13.

As shown in FIG. 1, the hub broadcasts 15 signals related to a list of chip phases 13. The broadcast may include a list of occupied reserved chip phases, or the broadcast may provide a list of available unreserved chip phases.

The chip phase reservation may be made by a transmitter requesting a phase reservation from the hub. Preferably the chip phase reservations are made by a transmitter starting a transmission of long files or digitized voice signals.

The hub recognizes the long incoming packets are consistent with long files or digitized compressed voice signals. The hub automatically reserves the chip phase for those transmissions and adds that chip phase to its list of occupied reserved chip phases or subtracts that chip phase from its broadcast list of available chip phases. As soon as the transmissions of the long files or the digitized compressed voice signals cease, the chip phase is no longer reserved by the hub. The hub removes that chip phase from its broadcast list of reserved occupied phases or adds that chip phase to its list of available chip phases. Alternatively, the transmitter may indicate the end of the long files or digitized compressed voice signals, where upon the hub changes its broadcast.

A first system 1 is show in FIG. 1 in which the hub may communicate 17 over a long distance with a gateway.

Figure 3:
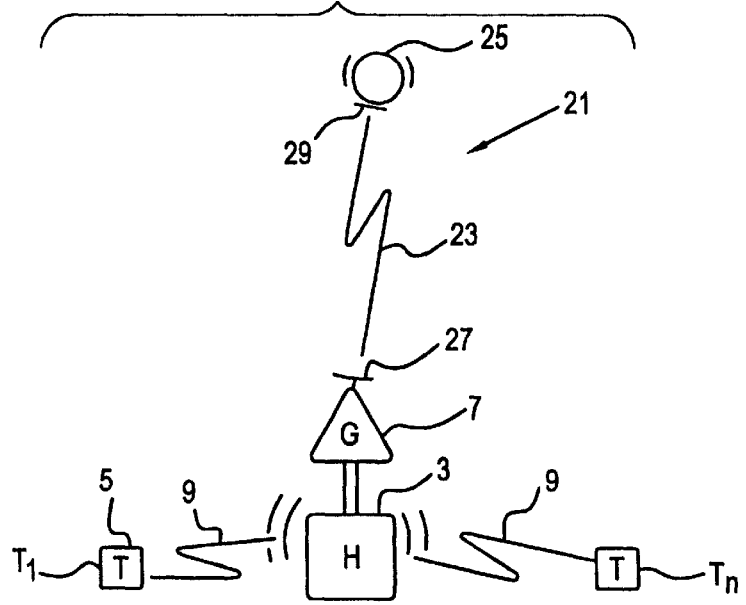
FIG. 3 represents an alternative SAMA system.

FIG. 3 schematically represents an alternate form of the system in which a hub which is connected to a gateway broadcast occupied or available chip phases for reservations to transmitters T1 through Tn.

In the form of the invention 21 shown in FIG. 3, hub 3 directly communicates with a gateway 7 which conducts radio communications 23 between a satellite 25 using antennas 27 and 29.

Because every bit is spread into chips by the same sequence, there is a determined frequency spectrum for the SAMA channel.

For the SAMA system, the various rates and times used in the channel are:

Sample Rate

This is the rate at which the in phase and quadrature (I/Q) analog to digital converters are run. To ease the implementation, the sample rate is ¼ the nominal carrier of 70 Mhz or 17.5 MSPS. The chips are over sampled by eight times.

Baud Time

This is the modulation rate of the 70 MHz carrier or how often a transition in quadrature angle is made. Each transition represents two chips. The Baud rate is 2.1875 MHz or ⅛ the sample rate.

Symbol Time

The spreading code is 31 chips long. The PN match filter produces a symbol every 31 Bauds for a symbol time 14.17 microseconds. Each symbol represents two bits. The data rate is 141 KBPS Sync Time Every packet starts with a 24 bit sync field. The packet sync filter looks for this field. It is 170 microseconds long.

Packet Time

The longest packets are 512 bits of data plus 24 bits of sync for a total time of 3.8 milliseconds.

While the invention has been described with reference to specific embodiments, modifications and variations of the invention may be constructed without departing from the scope of the invention, which is defined in the following claims.

We claim:

1. A Spread Aloha Multiple Access (SAMA) Reservation Channel Protocol method comprising: transmitting packets of data bytes as chips in particular phases on a multiple access channel using identical spreading codes and interposing the data packets from distinct individual sources, reserving chip phases for transmitting long files or digitized compressed voice signals in the data packets, broadcasting from a hub station lists of chip phases to users of the channel and insuring that no transmitter other than the transmitter making the reservation transmits data packets in chips at an occupied chip phase.

2. The method of claim 1, wherein the broadcasting a list of chip phases by the hub station comprises broadcasting a list of reserved chip phases.

3. The method of claim 1, wherein the broadcasting a list of chip phases by the hub station comprises broadcasting a list of free chip phases.

4. A method of using a Spread ALOHA Multiple Access (SAMA) channel comprising: using a reservation protocol for transmitting long data files or digitized compressed voice signals from a transmitter to a hub, reserving chip phases and transmitting chips representative of bits in spread data packets in the reserved chip phases used in the transmitting of the data packets.

5. The method of claim 4, further comprising reserving the chip phases by beginning the transmitting of chips.

6. The method of claim 4, further comprising broadcasting a list of chip phases by the hub.

7. The method of claim 6, wherein the broadcasting a list of chip phases by the hub station comprises broadcasting a list of reserved chip phases.

8. The method of claim 6, wherein the broadcasting a list of chip phases by the hub station comprises broadcasting a list of free chip phases.

9. A Spread Aloha Multiple Access (SAMA) Reservation Channel Protocol method comprising: transmitting data packets of bits as chips in particular phases on a multiple access channel using identical spreading codes and multiplexing the data packets from distinct individual sources, receiving the data packets at a hub station, separating the multiplexed data packets from the distinct individual sources according to chip phases at the hub station, reserving particular chip phases by at least one of the individual sources for transmitting long files or digitized compressed voice signals in the data packets from the at least one source, broadcasting from the hub station lists of chip phases to the sources using the multiple access channel and insuring that no source other than the source making the reservation transmits data packets in chips at a reserved occupied chip phase.

10. The method of claim 9, wherein the broadcasting a list of chip phases by the hub station comprises broadcasting a list of reserved chip phases.

11. The method of claim 9, wherein the broadcasting a list of chip phases by the hub station comprises broadcasting a list of free chip phases.

* * * * *